Aug. 23, 1932.   F. E. ASELTINE   1,873,256

SHOCK ABSORBER

Filed Feb. 27, 1930

Inventor

FRED E. ASELTINE

By Spencer, Hardman and Fehr

Attorneys

Patented Aug. 23, 1932

1,873,256

UNITED STATES PATENT OFFICE

FRED E. ASELTINE, OF DAYTON, OHIO, ASSIGNOR TO DELCO PRODUCTS CORPORATION, OF DAYTON, OHIO, A CORPORATION OF DELAWARE

SHOCK ABSORBER

Application filed February 27, 1930. Serial No. 431,767.

This invention relates to improvements in hydraulic shock absorbers.

It is among the objects of the present invention to provide a hydraulic shock absorber with a substantially quiet, pressure release valve.

Further objects and advantages of the present invention will be apparent from the following description, reference being had to the accompanying drawings wherein a preferred embodiment of one form of the present invention is clearly shown.

Figure 1:
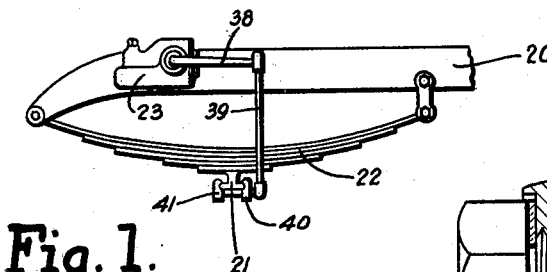
Fig. 1 is a fragmentary side view of a vehicle chassis equipped with the present invention, the wheels of the vehicle being omitted for the sake of clearness.
Figure 3:
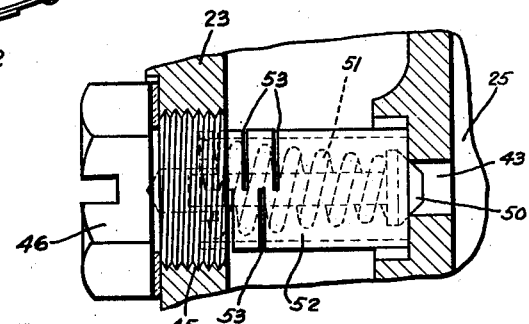
Fig. 3 is a fragmentary part sectional view on an enlarged scale showing the pressure release device of the shock absorber.

Referring to the drawing, the numeral 20 designates the frame of the vehicle which is supported upon the vehicle axle 21 by vehicle springs 22.

The shock absorber comprises a casing 23, presenting a fluid reservoir 24 and a cylinder 25. A cap 26 is secured by screws 27 upon the casing 23.

Within the cylinder 25 there is a piston 28 having a passage 29 through the head thereof which provides for the transfer of fluid from one side of the piston to the other, the flow of fluid through the passage 29 is controlled by the intake valve 30 yieldably held against an annular ridge 31 surrounding the passage 29 by a spring 32. One end of the spring engages the valve, the other rests upon the abutment cup 33. This cup is maintained against the inner surface of the piston head by a spring 34 which rests upon the closed end 35 of the cylinder. This spring 34 not only maintains the abutment cup 33 of the valve against the piston head, but it also urges the piston 28 upwardly in the cylinder 25 so that its head is maintained in substantially constant engagement with the free end of the rocker arm 36, supported in turn upon the rocker shaft 37. Rocker shaft 37 is journalled within bearings provided by the casing 23, one end of said rocker shaft extending outside the casing and having the shock absorber operating arm 38 provided thereon. The free end of arm 38 is swivelly secured to one end of the connecting link 39, the other end of said link being swivelly secured to the bracket 40 which is anchored to the axle 31 by the clamping member 41. The set screw 42 secures the rocker arm 36 to the rocker shaft 37 so that said arm must rotate with said shaft.

A port 43 is provided in the wall of the cylinder forming a communication between the compression chamber formed in the cylinder 25 by the piston 28 and the fluid reservoir 24. In coaxial alignment with this port 43 the casing is provided with an opening 45, screw-threaded to receive the plug 46. This plug has a recess 47 substantially centrally thereof which receives the end of the stem 48 of valve 49. On this stem there is provided a valve head 50 which is adapted to engage the annular peripheral edge of port 43, said head being maintained in engagement with said edge by a spring 51 surrounding the pin 48 and interposed between the valve head 50 and the plug 46. Valve 49 controls the flow of fluid through the port 43, normally closing said port.

Between the plug 46 and the cylinder portion surrounding the port 43 there is clamped a tubular member 52 provided with spaced slots 53. These spaced slots are transverse as shown in the drawings, and are preferably located at the end of the tubular member 52 more remote from the valve head 50 or port 43.

Figure 2:
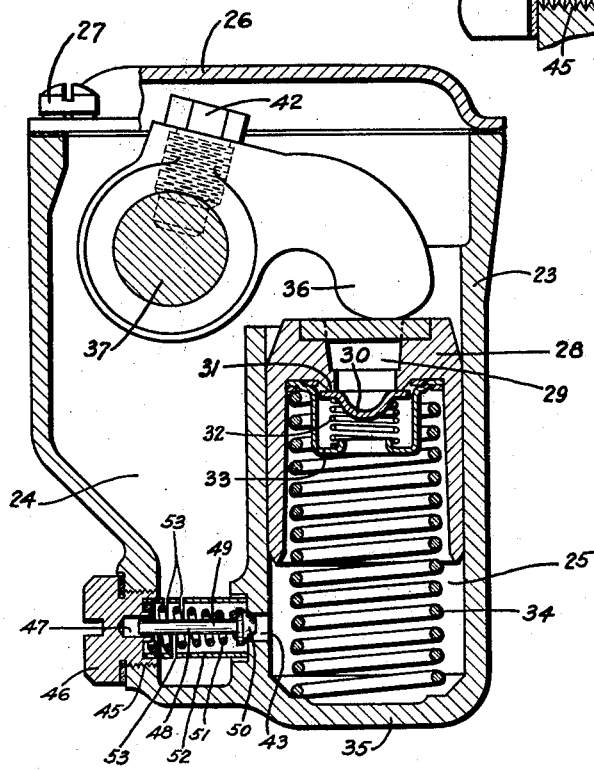
Fig. 2 is a sectional view taken through the center of the shock absorber.

When the axle 21 of the vehicle is moved toward the frame 20, due to the striking of an obstruction in the roadway, springs 22 are flexed and link 38 will move the shock absorber operating arm counter-clockwise as regards Figs. 1 and 2, thus the rocker arm 36 will likewise be moved counter-clockwise. This permits spring 34 to move the piston 28 upwardly in the cylinder 25 and fluid will move the valve 30 against the effect of spring 32 to open the passage 29 in the piston head thus to permit fluid to flow from the reservoir into the cylinder space beneath the piston.

As soon as this flexing movement of the springs 22 ceases, they will have a tendency to return to normal, unflexed position with a sudden, rebounding movement, which, if permitted, will result in disagreeable jars and jolts being transmitted to the frame of the vehicle and consequently to the body supported by the frame. In order to avoid these jars and jolts, the present device controls the return of the springs 22 to normal position for, as said springs begin to move away from frame 20, the link 38 will operate the shock absorber operating arm 37 clockwise, resulting in a similar movement of the rocker arm 36. This pushes the piston 28 downward into the cylinder 25, exerting a pressure upon the fluid therein. When this pressure attains a proper degree the valve head 50 will be moved from engagement with the peripheral edge of the port 42 and thus will be established a restricted pressure relieving flow of fluid from the compression chamber of cylinder 25 through port 42, past the valve head 50 into the reservoir 24. This restriction to the escape of fluid from the cylinder will resist the movement of the piston and thus unflexing movements of the spring will be resisted.

Under some circumstances when pressure release devices are suddenly opened to provide a restricted flow of fluid from one chamber to another, a hissing sound will be produced which, if not properly controlled, becomes quite objectionable, especially in the operation of motor vehicles having quietly operating motors. Applicant has provided a tubular member 52 about his pressure release valve 49, which member acts as a muffler tending to reduce or practically eliminate the hissing sound mentioned. In this instance the fluid being ejected through the port 42 past the valve 50 will enter into the tubular member 52, passing through it until it reaches the transverse slots 53 through which said fluid will then enter the fluid reservoir 24. Any hissing sounds resulting from the fluid passing through the orifice provided between the port 42 and the valve head 50 will be substantially muffled within the tubular member 52. By locating the slots 53 remote from the port 42 in the valve head 50, a body of fluid is provided within the tubular member 52 which has a tendency to aid in the muffling of the hiss.

While the form of embodiment of the present invention as herein disclosed, constitutes a preferred form, it is to be understood that other forms might be adopted, all coming within the scope of the claims which follow.

What is claimed is as follows:

1. A shock absorber comprising in combination, a casing presenting a fluid reservoir and a cylinder; a piston in said cylinder forming a compression chamber therein; means for operating said piston; a port connecting the compression chamber with the fluid reservoir; an opening in the casing coaxially aligned with the port; a recessed plug in the said opening; a valve supported by the plug for controlling the fluid flow through said port; a spring interposed between the plug and valve and yieldably urging the valve to close the port; and a tubular member clamped between the plug and the cylinder wall surrounding the port, said member having a plurality of slots through which the fluid enters the reservoir when the valve is operated in response to the movement of the piston in one direction.

2. A shock absorber comprising in combination, a casing presenting a fluid reservoir and a cylinder; a piston in said cylinder forming a compression chamber therein; means for operating said piston; a port connecting the compression chamber with the fluid reservoir; an opening in the casing coaxially aligned with the port; a recessed plug in the said opening; a valve supported by the plug for controlling the fluid flow through said port; a spring interposed between the plug and valve and yieldably urging the valve to close the port; and a tubular member clamped between the plug and the cylinder wall surrounding the port, said member having a plurality of transverse slots more adjacent the end of the member engaging the plug, through which fluid flows to the reservoir when the valve is operated to open the port in response to movement of the piston in one direction.

In testimony whereof I hereto affix my signature.

FRED E. ASELTINE.